United States Patent
Steffen et al.

(10) Patent No.: US 9,810,163 B2
(45) Date of Patent: Nov. 7, 2017

(54) MULTIPLE ELEMENT FIRING STRATEGY FOR CRYOGENIC PUMP

(71) Applicant: Caterpillar Inc., Peoria, IL (US)

(72) Inventors: Joshua W. Steffen, El Paso, IL (US); Sunil J. Bean, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 318 days.

(21) Appl. No.: 14/753,613

(22) Filed: Jun. 29, 2015

(65) Prior Publication Data
US 2016/0377041 A1    Dec. 29, 2016

(51) Int. Cl.
| | |
|---|---|
| F02D 19/06 | (2006.01) |
| F02D 19/10 | (2006.01) |
| F02D 41/38 | (2006.01) |
| F02D 41/00 | (2006.01) |

(52) U.S. Cl.
CPC ..... *F02D 19/0644* (2013.01); *F02D 19/0684* (2013.01); *F02D 19/10* (2013.01); *F02D 41/0027* (2013.01); *F02D 41/3845* (2013.01); *F02D 19/0694* (2013.01); *F02D 2041/3881* (2013.01); *F02D 2200/0602* (2013.01); *Y02T 10/36* (2013.01)

(58) Field of Classification Search
CPC .... F02D 19/021; F02D 19/022; F02D 19/023; F02D 19/027; F02D 19/0605; F02D 19/0607; F02D 19/0628; F02D 19/0647; F02D 19/0663; F02D 19/0684; F02D 41/3082; F02D 41/0027; F02D 41/3845; F02D 2200/0602; F02M 21/0209; F02M 21/0245; F02M 21/0218; F02M 37/043; F02M 37/06; F02M 37/08; F02M 37/12; F02M 39/02; F02M 43/02; F02M 59/102; F02M 59/105; F02M 59/107; F02M 59/447; F04B 49/02; F04B 49/065; F04B 49/08
USPC ................... 417/901, 7, 426, 44.2
See application file for complete search history.

(56) References Cited

U.S. PATENT DOCUMENTS

| | | | | | |
|---|---|---|---|---|---|
| 2,031,346 | A | * | 2/1936 | Wahlmark | F02M 41/08 123/495 |
| 3,279,383 | A | * | 10/1966 | Smith | F01L 25/08 417/234 |
| 4,321,014 | A | * | 3/1982 | Eburn, Jr. | F04B 11/0058 417/27 |

(Continued)

FOREIGN PATENT DOCUMENTS

CA       2831759 A1    1/2014

*Primary Examiner* — Joseph Dallo
*Assistant Examiner* — Anthony L Bacon
(74) *Attorney, Agent, or Firm* — Leydig, Voit & Mayer, Ltd.

(57) ABSTRACT

A pump has a plurality of pumping elements, each being independently responsive to an actuation signal from a controller. The controller is programmed to maintain a desired pressure at the pump discharge, monitor the fluid pressure at the pump discharge, compare the fluid pressure with the desired fluid pressure to determine a pressure error, provide commands to sequentially actuate the pumping elements when the pressure error is within a threshold range, and provide commands to actuate more than one of the plurality of pumping elements simultaneously, such that more than one pumped amounts of fluid are delivered simultaneously at the pump discharge, when the pressure error droops outside of the threshold range.

20 Claims, 6 Drawing Sheets

(56) References Cited

U.S. PATENT DOCUMENTS

| | | | | |
|---|---|---|---|---|
| 4,522,174 | A | * | 6/1985 | Babitzka .................. F02B 3/04 |
| | | | | 123/300 |
| 5,545,015 | A | * | 8/1996 | Scherrer ................ F04B 15/08 |
| | | | | 417/360 |
| 7,293,418 | B2 | | 11/2007 | Noble et al. |
| 2011/0214642 | A1 | * | 9/2011 | Shafer ............... F02M 63/0285 |
| | | | | 123/456 |
| 2014/0165584 | A1 | | 6/2014 | Foege |
| 2014/0271262 | A1 | * | 9/2014 | Frey ..................... F04B 9/1372 |
| | | | | 417/302 |
| 2016/0377068 | A1 | * | 12/2016 | Brown .................. F04B 23/02 |
| | | | | 417/53 |

* cited by examiner

MULTIPLE ELEMENT FIRING STRATEGY FOR CRYOGENIC PUMP

TECHNICAL FIELD

This patent disclosure relates generally to pumps and, more particularly, to cryogenic fuel pumps for mobile applications.

BACKGROUND

Many large mobile machines such as mining trucks, locomotives, marine applications and the like have recently begun using alternative fuels, alone or in conjunction with traditional fuels, to power their engines. For example, large displacement engines may use a gaseous fuel, alone or in combination with a traditional fuel such as diesel, to operate. Because of their relatively low densities, gaseous fuels, for example, natural gas or petroleum gas, are carried onboard vehicles in liquid form. These liquids, the most common including liquefied natural gas (LNG) or liquefied petroleum gas (LPG), are cryogenically stored in insulated tanks on the vehicles, from where a desired quantity of fuel is pumped, evaporated, and provided to fuel the engine.

The pumps that are typically used to deliver the LNG to the engine of the machine include pistons, which deliver the LNG to the engine. For example, while LNG may be stored at a pressure of about 300 psi, CNG for use by the engine may be provided at about 20.7 MPa. Such piston pumps, which are sometimes also referred to as cryogenic pumps, will often include a single piston that is reciprocally mounted in a cylinder bore. The piston is moved back and forth in the cylinder to draw in and then compress the gas. Power to move the piston may be provided by different means, the most common being electrical, mechanical or hydraulic power.

One example of a cryogenic pump can be found in U.S. Pat. No. 7,293,418 (the '418 patent), which describes a cryogenic, single-element pump for use in a vehicle. The pump discharges into an accumulator that is located within the tank, and uses a single piston pump that is connected to a drive section via a piston rod. The drive section is disposed outside of the tank.

Pumps such as the pump described in the '418 patent are required to generate sufficient gas pressure required to operate the engine, for example, sufficient pressure to overcome cylinder pressure in the case of a direct-injection gas engine application, but are not always up to the task. Under certain operating conditions, the engine will undergo relatively rapid transient changes in engine speed, engine load, and other engine operating conditions, which can be difficult for mechanical equipment (like fuel pumps) to keep up with. For example, when the engine operates at an idle condition, the LNG pump is operating slowly. When the engine operation changes such that the engine requires a high rate of fueling, such change can occur very quickly and the LNG pump may lag in providing a sufficient pressure. The pump lag will cause a pressure drop in the gas supply to the engine, because the engine will be consuming more than the pump can supply, at least temporarily. The lower gas pressure will often lead to lower fuel injection pressures in the engine cylinders, which can cause poor engine performance and emissions.

SUMMARY

The present disclosure is generally directed to a hydraulically driven cryogenic pump comprising multiple pumping elements. Each of the pumping elements is selectively actuated by a controller such that, under times of high fuel demand, the controller may actuate more than one pumping element at the same time or at least in an overlapping fashion, at least temporarily, such that a surge in engine fuel demand can be met without the loss of gas pressure that is typically found in similar applications.

The disclosure, therefore, describes, in one aspect, a fluid system. The fluid system includes a pump having a plurality of pumping elements, each of the plurality of pumping elements being independently responsive to a corresponding actuating signal to perform a pumping stroke that delivers a pumped amount of fluid at a pump discharge, a pressure sensor disposed to monitor a fluid pressure at the pump discharge and provide a pressure signal, and an electronic controller. The electronic controller is associated with the pump and the pressure sensor, and disposed to receive the pressure signal and provide the corresponding actuating signal to each of the plurality of pumping elements. The electronic controller is further programmed to maintain a desired pressure at the pump discharge. The electronic controller is programmed to monitor the fluid pressure provided by the pressure sensor, compare the fluid pressure with the desired pressure to determine a pressure error, provide commands to sequentially actuate the plurality of pumping elements when the pressure error is within a threshold range, and provide commands to actuate more than one of the plurality of pumping elements simultaneously, such that more than one pumped amounts of fluid are delivered simultaneously at the pump discharge, when the pressure error droops outside of the threshold range.

In another aspect, the disclosure describes a method for operating a pump. The method includes providing a plurality of pumping elements, each being independently actuated in response to an actuation signal from a controller, receiving and monitoring at the controller a plurality of engine operating parameters including a pressure signal that is directly or indirectly indicative of a pump discharge pressure at a pump discharge. The method further includes comparing the pump discharge pressure with a desired discharge pressure, providing a command to sequentially actuate pumping elements at a desired frequency, determining whether the pump is capable of providing a desired pressure within a desired time, and providing a command to non-sequentially actuate more than one pumping element simultaneously when an indication is present that sequential pumping element actuations will be insufficient to achieve the desired discharge pressure of the pump.

In yet another aspect, the disclosure describes a fuel system for an engine. The fuel system includes a cryogenic fluid storage tank containing a fuel, a pump having a plurality of pumping elements, each of the plurality of pumping elements being independently responsive to a corresponding actuation signal to perform a pumping stroke that delivers a pumped amount of fuel at a pump discharge, a pressure sensor disposed to monitor a fluid pressure at the pump discharge and provide a pressure signal, and an electronic controller. The electronic controller is associated with the pump and the pressure sensor. The electronic controller is disposed to receive the pressure signal and provide the corresponding actuation signal to each of the plurality of pumping elements. The electronic controller is further programmed to maintain a desired pressure at the pump discharge. The electronic controller is programmed to monitor the fluid pressure provided by the pressure sensor, and compare the fluid pressure with the desired pressure to determine a pressure error. The electronic controller is further programmed to provide commands to sequentially actuate the plurality of pumping elements when the pressure error is within a threshold range, and provide commands to actuate more than one of the plurality of pumping elements simultaneously, such that more than one pumped amounts of fluid are delivered simultaneously at the pump discharge, when the pressure error droops outside of the threshold range.

DETAILED DESCRIPTION

The present disclosure is applicable to hydraulically actuated pumps for pumping a fluid such as cryogenically stored fuel for applications having rapid changes in fuel demand. In the disclosed, exemplary pump embodiments, the hydraulic architecture of the pump allows it to have the ability to actuate multiple pumping elements at once, which can, in turn, provide short bursts of higher LNG flow that can be used to overcome droops in discharge pressure during rapid engine transients, provide a pressure pulse downstream of the pump that can be detected by the pressure sensor and used to determine the time it is taking for the pistons to reach end of stroke for a given hydraulic pressure.

Figure 1:
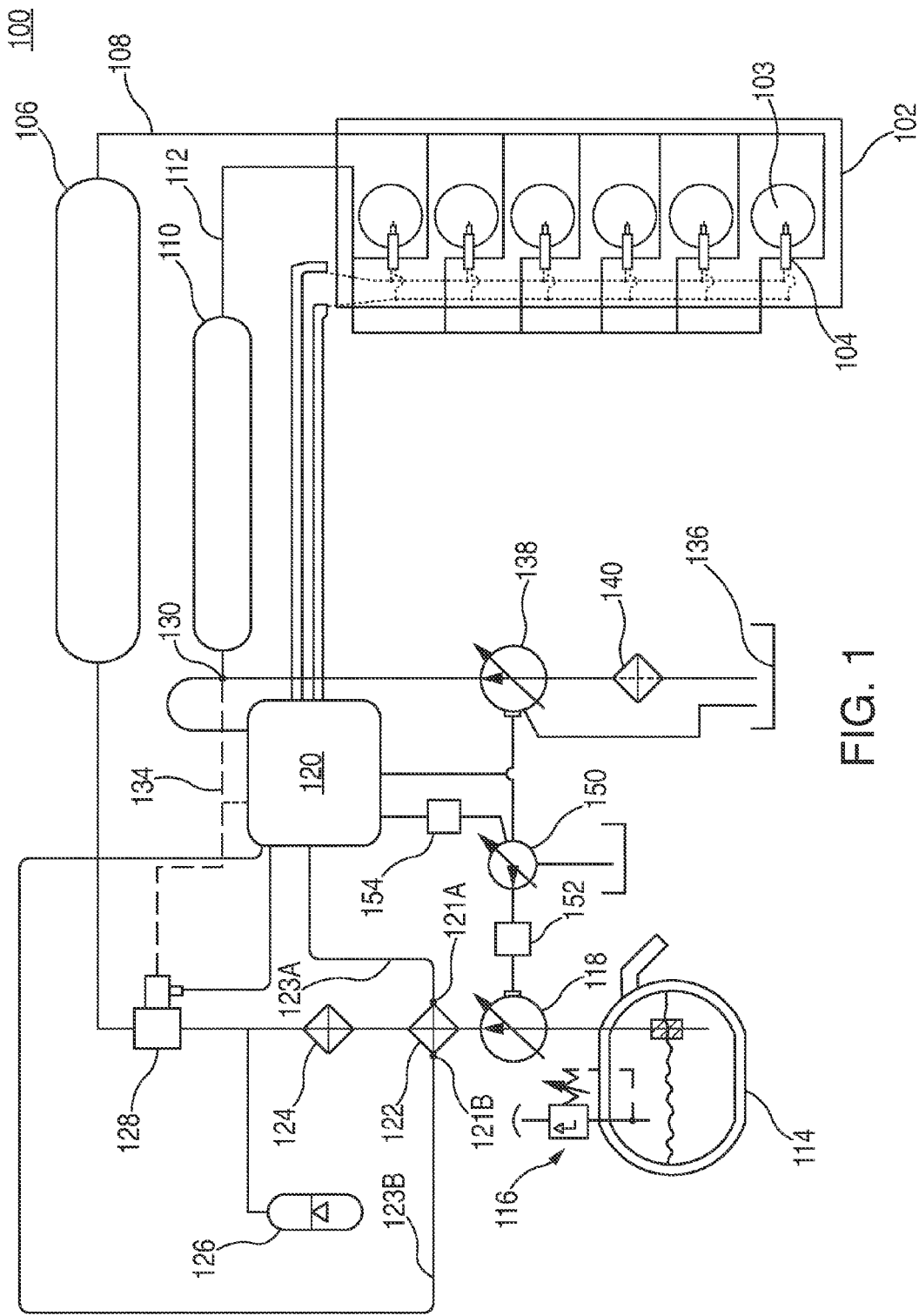
FIG. 1 is a block diagram of an engine system having a compressed gas fuel system that includes a gaseous fuel storage tank and corresponding fuel pump in accordance with the disclosure.

Therefore, this disclosure relates to engines using a gaseous fuel source such as direct injection gas (DIG) or indirect injection gas engines using diesel or spark ignition. More particularly, the disclosure relates to an embodiment for an engine system that includes a gaseous fuel storage tank having a pump that supplies cryogenically stored fluid to fuel an engine. A block diagram of a DIG, engine system 100, which in the illustrated embodiment uses diesel as the ignition source, is shown in FIG. 1, but it should be appreciated that indirect injection engines, and/or engines using a different ignition mode are contemplated. The engine system 100 includes an engine 102 (shown generically in FIG. 1) having a fuel injector 104 associated with each engine cylinder 103. The fuel injector 104 can be a dual-check injector configured to independently inject predetermined amounts of two separate fuels, in this case, diesel and gas, into the engine cylinders.

The fuel injector 104 is connected to a high-pressure gaseous fuel rail 106 via a high-pressure gaseous fuel supply line 108 and to a high-pressure liquid fuel rail 110 via a liquid fuel supply line 112. In the illustrated embodiment, the gaseous fuel is natural or petroleum gas that is provided through the high-pressure gaseous fuel supply line 108 at a pressure of between about 10-50 MPa, and the liquid fuel is diesel, which is maintained within the high-pressure liquid fuel rail 110 at about 15-100 MPa, but any other pressures or types of fuels may be used depending on the operating conditions of each engine application. It is noted that although reference is made to the fuels present in the high-pressure gaseous fuel supply line 108 and the high-pressure liquid fuel rail 110 using the words "gaseous" or "liquid," these designations are not intended to limit the phase in which is fuel is present in the respective rail and are rather used solely for the sake of discussion of the illustrated embodiment. For example, the fuel provided at a controlled pressure within the high-pressure gaseous fuel supply line 108, depending on the pressure at which it is maintained, may be in a liquid, gaseous or supercritical phase. Additionally, the liquid fuel can be any hydrocarbon based fuel; for example DME (Di-methyl Ether), biofuel, MDO (Marine Diesel Oil), or HFO (Heavy Fuel Oil).

Whether the engine system 100 is installed in a mobile or a stationary application, each of which is contemplated, the gaseous fuel may be stored in a liquid state in a tank 114, which can be a cryogenic storage tank that is pressurized at a relatively low pressure, for example, atmospheric, or at a higher pressure. In the illustrated embodiment, the tank 114 is insulated to store liquefied natural gas (LNG) at a temperature of about −160° C. (−256° F.) and a pressure that is between about 100 and 1750 kPa, but other storage conditions may be used. The tank 114 further includes a pressure relief valve 116 and a fill port 144. The fill port 144 may include special or appropriate features for interfacing with a compressed natural gas (CNG) and/or liquid petroleum gas (LPG) fill hose or valve. In the description that follows, a DIG engine system embodiment is used for illustration, but it should be appreciated that the systems and methods disclosed herein are applicable to any machine, vehicle or application that uses cryogenically stored gas, for example, a locomotive in which the tank 114 may be carried in a tender car.

Relative to the particular embodiment illustrated, during operation, LNG from the tank is pressurized, still in a liquid phase, in a pump 118, which raises the pressure of the LNG while maintaining the LNG in a liquid phase. The pump 118 is configured to selectively increase the pressure of the LNG to a pressure that can vary in response to a pressure command signal provided to the pump 118 from an electronic controller 120. The pump 118 is shown external to the tank 114 in FIG. 1 for illustration, but it is contemplated that the pump 118 may at least partially be disposed within the tank 114, as is illustrated in the figures that follow, for example, in FIG. 2. Although the LNG is present in a liquid state in the tank, the present disclosure will make reference to compressed or pressurized gas for simplicity when referring to gas that is present at a pressure that exceeds atmospheric pressure.

The pressurized LNG provided by the pump 118 is heated in a heat exchanger 122. The heat exchanger 122 provides heat to the compressed LNG to reduce density and viscosity while increasing its enthalpy and temperature. In one exemplary application, the LNG may enter the heat exchanger 122 at a temperature of about −160° C., a density of about 430 kg/m$^3$, an enthalpy of about 70 kJ/kg, and a viscosity of about 169 µPa s as a liquid, and exit the heat exchanger at a temperature of about 50° C., a density of about 220 kg/m$^3$, an enthalpy of about 760 kJ/kg, and a viscosity of about 28 µPa s. It should be appreciated that the values of such representative state parameters may be different depending on the particular composition of the fuel being used. In general, the fuel is expected to enter the heat exchanger in a cryogenic, liquid state, and exit the heat exchanger in a supercritical gas state, which is used herein to describe a state in which the fuel is gaseous but has a density that is between that of its vapor and liquid phases.

The heat exchanger 122 may be any known type of heat exchanger or heater for use with LNG. In the illustrated embodiment, the heat exchanger 122 is a jacket water heater that extracts heat from engine coolant. In alternative embodiments, the heat exchanger 122 may be embodied as an active heater, for example, a fuel fired or electrical heater, or may alternatively be a heat exchanger using a different heat source, such as heat recovered from exhaust gases of the engine 102, a different engine belonging to the same system such as what is commonly the case in locomotives, waste heat from an industrial process, and other types of heaters or heat exchangers such as ambient air fin or tube heat exchangers. In the embodiment shown in FIG. 1, which uses engine coolant as the heat source for the heat exchanger 122, a pair of temperature sensors 121A and 121B are disposed to measure the temperature of engine coolant entering and exiting the heat exchanger 122 and provide corresponding temperature signals 123 to the electronic controller 120.

Liquid fuel, or in the illustrated embodiment diesel fuel, is stored in a fuel reservoir 136. From there, fuel is drawn into a variable displacement pump 138 through a filter 140 and at a variable rate depending on the operating mode of the engine. The rate of fuel provided by the variable displacement pump 138 is controlled by the pump's variable displacement capability in response to a command signal from the electronic controller 120. Pressurized fuel from the variable displacement pump 138 is provided to the high-pressure liquid fuel rail 110. Similarly, the pump 118 has a variable supply capability that is responsive to a signal from the electronic controller 120.

Gas exiting the heat exchanger 122 is filtered at a filter 124. As can be appreciated, the gas passing through the filter 124 may include gas present in more than one phase such as gas or liquid. An optional gas accumulator 126 may collect filtered gas upstream of a pressure regulator 128 that can selectively control the pressure of gas provided to a gas manifold 106 that is connected to the high-pressure gaseous fuel supply line 108. To operate the pump 118, a hydraulic pump 150 having a variable displacement and selectively providing pressurized hydraulic fluid to the pump 118 via a valve system 152 is used. Operation of the hydraulic pump 150 is controlled by an actuator 154 that responds to commands from the electronic controller 120.

Figure 2:
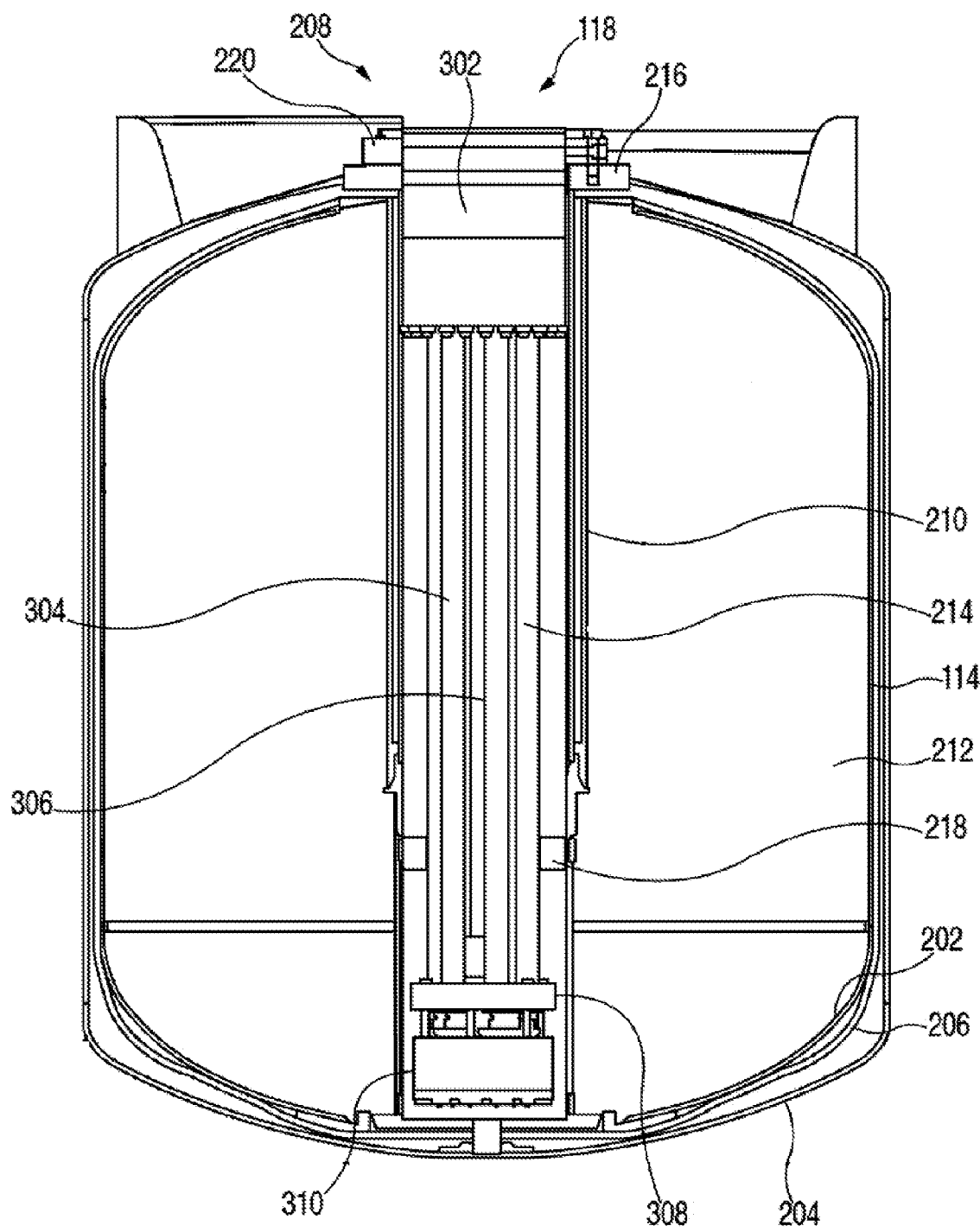
FIG. 2 is a section view of a cryogenic pump in accordance with the disclosure installed into a cryogenic fluid storage tank.

A fragmented view of the tank 114 having the pump 118 at least partially disposed therein is shown in FIG. 2. The tank 114 may include an inner wall 202, which contains the pressurized LNG, and an outer wall 204. A layer of insulation 206 may be disposed along a gap between the inner wall 202 and the outer wall 204. Both the inner wall 202 and the outer wall 204 have a common opening 208 at one end of the tank, which surrounds a cylindrical casing 210 that extends into a tank interior 212. The cylindrical casing 210 is hollow and defines a pump bore 214 therein that extends from a mounting flange 216 into the tank interior 212 and accommodates the pump 118 therein. A seal 218 separates the interior of the tank 212 from the common opening 208 at least at the mounting flange 216 along the pump bore 214.

Figure 3:
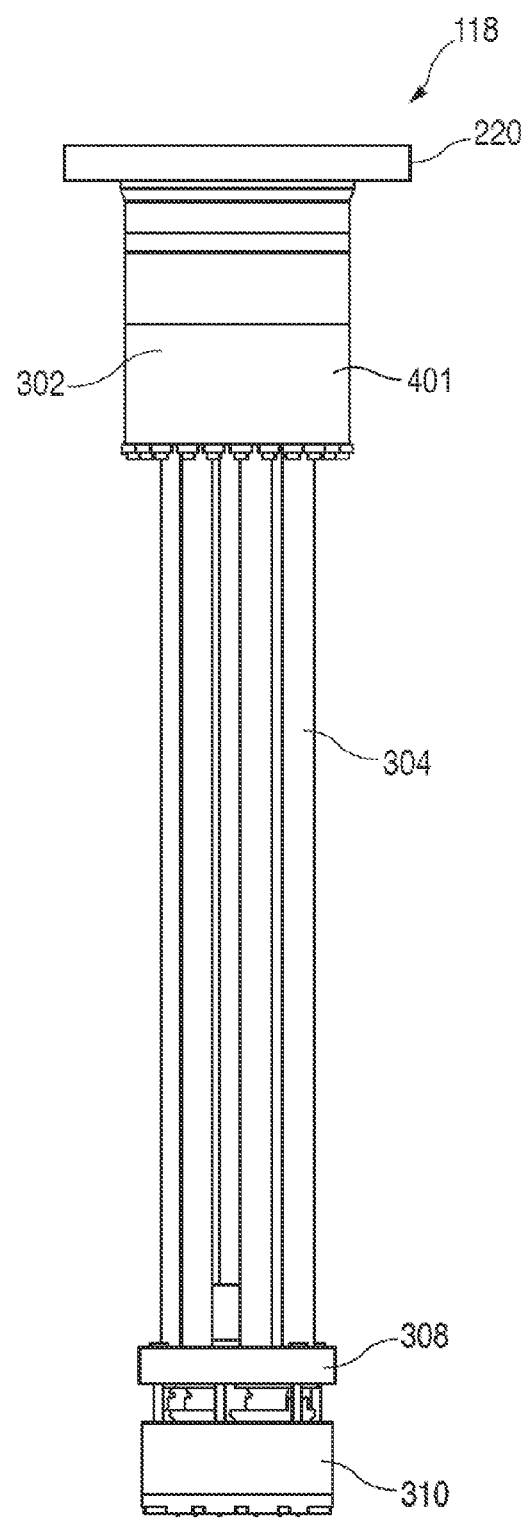
FIG. 3 is an outline view of a multi-element pump in accordance with the disclosure.

The pump 118 in the illustrated embodiment has a generally cylindrical shape and includes a pump flange 220 that supports the pump 118 on the mounting flange 216 of the tank 114. An outline view of the pump 118, removed from the tank 114, is also shown in FIG. 3. The pump 118 generally includes an actuator portion 302 that operates to selectively actuate one or more pushrods 304. The pushrods 304, which are caused to reciprocate during operation by the actuator portion 302, extend from the actuator portion 302 to an actuation portion 308 that is associated with a pumping portion 310. During operation, the pumping portion 310, which may be immersed in cryogenic fluid, operates to pump fluid from the tank interior 212 out of the tank and through an outlet or pump discharge to supply the engine with fuel, as previously described. The pumping portion 310 is actuated for pumping fluid by the actuation portion 308, which in turn translates the reciprocal motion of the pushrods 304 into a pumping action that operates the pumping portion 310.

The pump 118 advantageously includes six, separately actuatable, pumping elements 400, but another number of pumping elements (there could be, for example, two, three, four, five, seven, etc. pumping elements) can be used, depending on the application. In the illustrated embodiment, six pumping elements, each with its own set of components, are disposed in diametrically opposed pairs symmetrically around the pump (see FIG. 5). Tappets that actuate the pushrods may be housed in a tappet housing 401 that forms bores symmetrically around the pump and supports or otherwise accommodates the various other components of the pump 118. The electronic controller 120 is configured and programmed to selectively actuate each pumping element by sending and appropriate command, at a desired time and for a desired duration, to each respective actuator 334 (FIG. 5) of the respective pumping elements 400.

Figure 4:
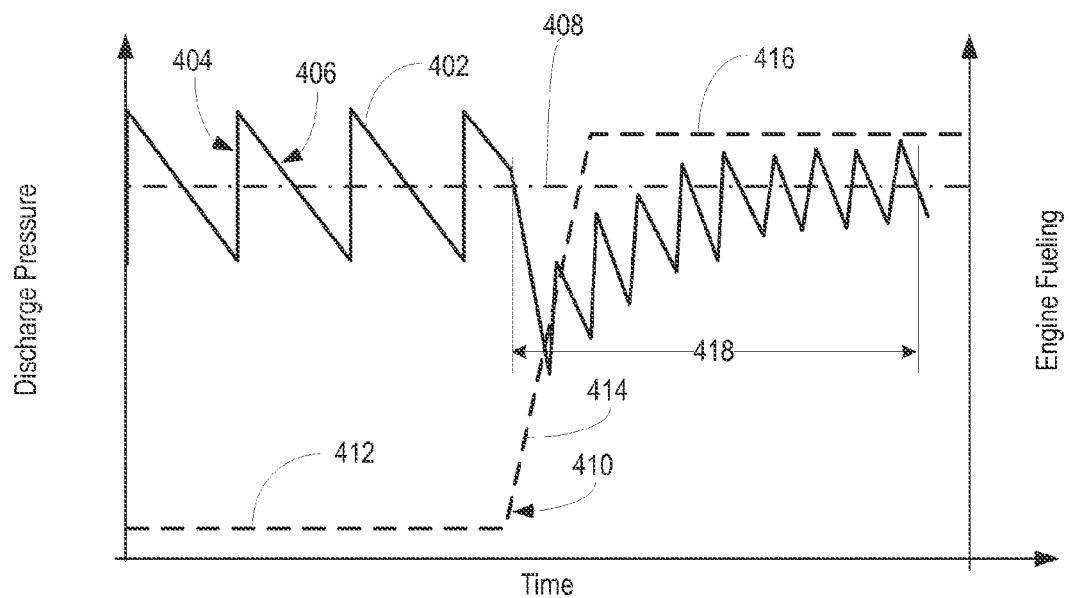
FIG. 4 is a chart showing a loss of gas pressure during a transient.

During operation, a high demand for LNG by the engine may cause a temporary drop in LNG pressure at the outlet of the pump. Such a condition is illustrated in the graph of FIG. 4, where discharge pressure of the pump is plotted over time during a transient increase in engine fuelling. More specifically, the discharge pressure 402 of a cryogenic pump is shown over time. The discharge pressure has a saw-tooth shape made up of a plurality of pressure rises 404 and drops 406, which indicate, respectively, a pressure rise during a discharge stroke of a plunger and the drop in pressure that follows as the engine is consuming the pumped fluid, until the subsequent discharge stroke increases the pressure once again, and so forth. On average, the discharge pressure 402 is maintained around at a desired discharge pressure 408.

The engine fueling is represented by a stepped line, which is low during a first segment 412, increases during a second segment 414, and remains high during a third segment 416, as shown in FIG. 4, to illustrate a rapid increase in engine fuelling. During the first segment 412 of engine fuelling, the discharge pressure 402 of the pump maintains a steady rate around the desired discharge pressure 408. Over the second segment 414, however, the discharge pressure 402 drops considerably, the frequency of element actuations increase, as shown in the increase in frequency of plunger discharges, as the pressure gradually increases over the third segment 416. During a period 418, as noted in the graph, which spans over the second segment 414 and an initial part of the third segment 416, the average, discharge pressure 402 of the pump is considerably below the desired discharge pressure 408, which can cause poor engine performance and emissions.

Figure 5:
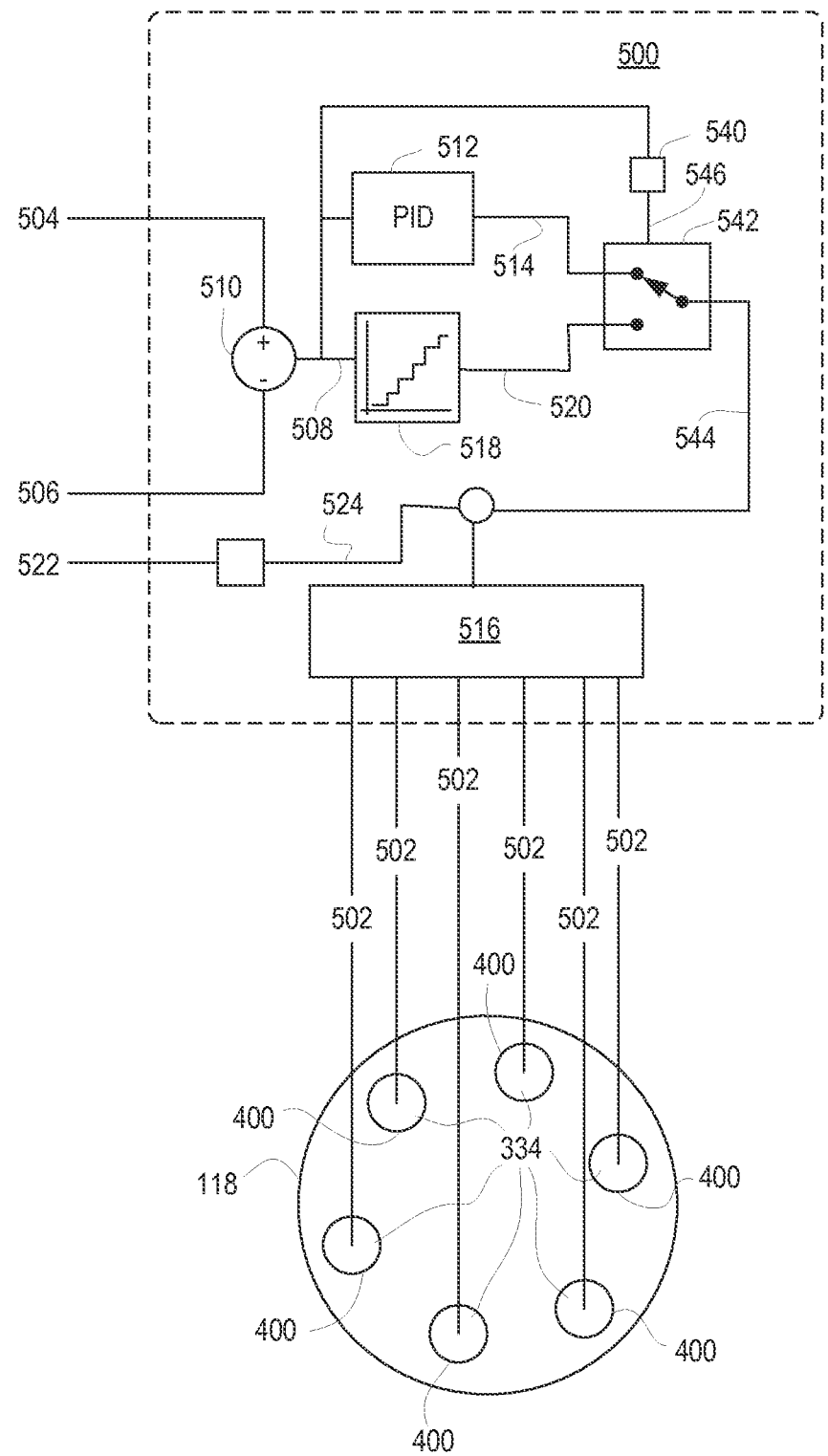
FIG. 5 is a schematic diagram of a pump controller in accordance with the disclosure.

To address this temporary inability of the engine to maintain a desired discharge pressure, a multiple element actuation strategy is used, as shown in the schematic diagram of FIG. 5. As shown in FIG. 5, a pump controller 500 is associated with, and controls, pumping elements 400 of the pump 118. Each of the pumping elements 400 receives an actuation command from the pump controller 500 for at a particular time and for a particular duration via a corresponding command output line 502, which is shown schematically but can include any time of analog or digital communication line. Moreover, the pump controller 500 may be incorporated in a standalone or integrated controller that controls other functions of a machine, and may be implemented in software or hardware in accordance with known electromechanical control systems. It should be appreciated that, although six pumping elements 400 are shown, fewer or more can be used depending on the size and type of pump.

In the embodiment shown in FIG. 5, the pump controller 500 receives as an input a feedback pressure signal 504, which is indicative, directly or indirectly, of a discharge pressure of the pump 118, which can be correlated with any other pressure in the system, for example, a gas pressure at a gas accumulator, engine fuel rail, or at the engine inlet. The pump controller 500 also receives as an input a desired pressure signal 506, which is directly or indirectly indicative of a desired gas pressure at a certain point of the system, for example, at the pump discharge or at the engine inlet. A difference or pressure error 508 is calculated at a summing junction 510 to indicate any divergence of the feedback pressure from the desired pressure. It is noted here that, as shown, for example, in FIG. 4, normal fluctuations may exist in the gas system due to the nature of the pump. Such fluctuations may be smoothed by appropriate filtering, moving averages, or other techniques such that, under normal operating conditions, an average pressure at the pump discharge or at another part of the system may be used to control the pump.

Many different control algorithms can be used to control the pump such that a desired pressure at the pump discharge can be maintained. In the illustrated embodiment, a proportional, integral and derivative (PID) controller 512 is used to adjust the pressure error 508 and provide a desired actuation command 514. The desired actuation command 514 may include information indicative of the frequency of pump element actuations that are desired such that an increase in discharge pressure corresponds to a higher actuation frequency, and a reduction in discharge pressure corresponds to a lower actuation frequency. The desired actuation command 514 is provided to a distributor function 516 which is associated with the various command output lines 502 and cycles actuation of the various pumping elements 400 according to the desired frequency.

To account for dynamic changes in demand of the system and to avoid pressure drops in the discharge pressure of the pump, the pump controller 500 is further configured with the ability to command actuation of more than one pumping element at a time. By performing multiple actuations of pumping elements 400 at the same time, the pressure at the pump discharge can be maintained. For purpose of discussion, the gas system volume is assumed to be finite such that a mass flow of gas into the volume, which is provided by the pump, should equal the mass flow of gas out form the volume, which represents the fuel consumed by the engine. With these assumptions, the ratio of pressure at the inlet and the outlet of the volume will be equal to the ratio of mass flows into and out from the volume. When the mass flow at the outlet increases rapidly, to maintain a constant pressure in the volume, there will have to be a concomitant increase in mass flow from the pump provided to the volume.

A pressure drop in the feedback pressure signal 504 may quickly and reliably indicate that the engine fuelling has increased. Alternatively, a predictive control based on a monitored parameter indicative of engine fuelling command may be used. In the illustrated embodiment, the pressure error 508 is provided to a step function 518, which can be configured and arranged to detect pressure drops that are beyond the capability of the pump without using multiple actuations over a predetermined time. For example, the capacity of the pump operating at full speed and without delays in the actuations of successive pumping elements may be measured and determined for a particular pump. The pressure response of the system can also be measured or otherwise determined such that, for a selected time period, the pump's ability to overcome a maximum pressure drop can be known. This pressure drop, which can be expressed by the pressure error 508, is monitored in the step function 518 such that an indication signal 520 can be actuated at times when the pressure error 508 exceeds the capability of the pump working at a maximum frequency of sequential actuation of pumping elements 400 within the selected period.

In the illustrated embodiment, the desired actuation command 514 and the indication signal 520 are provided to a switch 542, which selectively switches an output 544 between the desired actuation command 514, during periods of normal operation, or to the indication signal 520 at times when more than one pump element actuation is required. The switch 542 is controlled by a switch signal 546, which in the illustrated embodiment is provided as an output of a discriminator function 540 that operates based on the pressure error 508. For example, the discriminator function 540 may be a function that determines a derivative and/or magnitude of the error as being within or outside a set of threshold values so that, at times of a pressure drop in the system, the switch is activated in a quick fashion to provide actuation of multiple pumping elements, as previously described. The switch 542 can remain active while the switch signal 546 is active and/or for a predetermined time period before restoring normal operation by providing the desired actuation command 514.

In an alternative embodiment, the indication signal 520 may be added or otherwise appended to the desired actuation command 514 and the two can be provided to the distributor function 516 together. The distributor function 516 can determine, based on the indication signal 520, whether two or more simultaneous actuations of pumping elements should be carried out, and operates accordingly. Optionally, a gas temperature 522 can be used to provide a correction factor 524 to the desired actuation command 514 that accounts for changes in gas pressure with respect to gas temperature.

INDUSTRIAL APPLICABILITY

The present disclosure is applicable to any type of application that involves a compressed gas storage tank. In the illustrated embodiment, a land vehicle having a CNG or LPG fuel source that is carried in an on-board tank was used for illustration, but those of ordinary skill in the art should appreciate that the methods and systems described herein have universal applicability to any type of compressed gas tank that includes a pump for pumping liquefied gas from the tank to supply a system such as an engine with gas.

Figure 6:
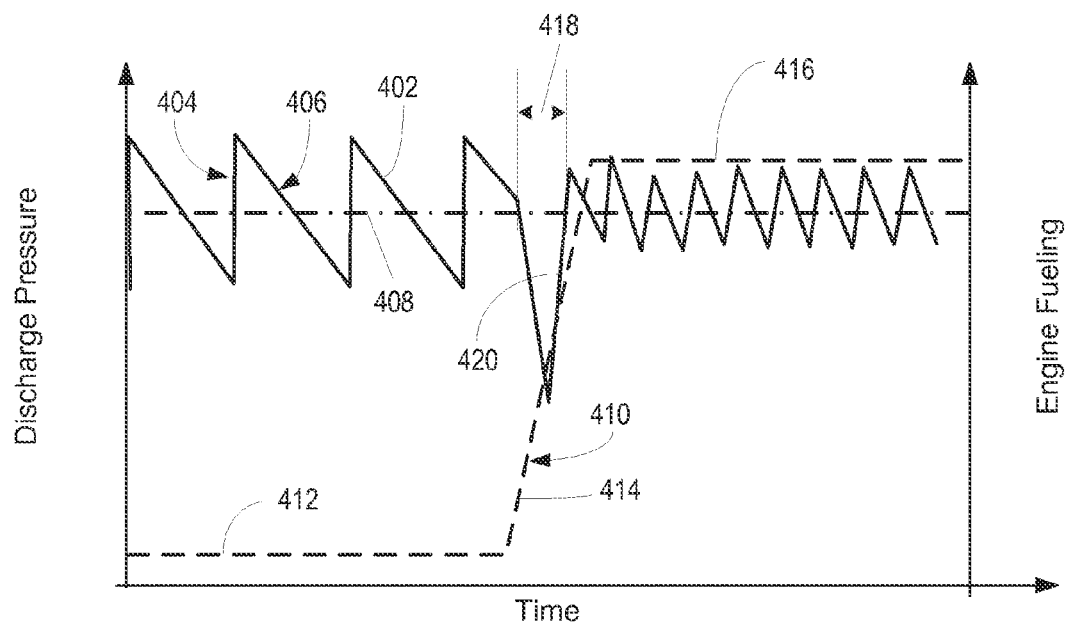
FIG. 6 is a chart showing an exemplary effect of a multiple element actuation control strategy in accordance with the disclosure.

A chart that illustrates an effect of a multiple pumping element actuation control algorithm is shown in FIG. 6, below FIG. 4, for comparison. In the chart of FIG. 6, where the same reference numerals are used as the chart shown in FIG. 4 for simplicity, a high demand for LNG by the is shown, but which does not exhibit the same pressure drop as FIG. 4. As in the chart of FIG. 4, in the chart of FIG. 6, the discharge pressure 402 of the cryogenic pump is shown over time and includes a series of pressure rises 404 and drops 406, which indicate, respectively, a pressure rise during a discharge stroke of a plunger and the drop in pressure that follows as the engine is consuming the pumped fluid, until the subsequent discharge stroke increases the pressure once again, and so forth. On average, the discharge pressure 402 is maintained around at a desired discharge pressure 408.

The engine fueling 410 is represented by a stepped line, which is low during a first segment 412, increases during a second segment 414, and remains high during a third segment 416. During the first segment 412 of engine fuelling, the discharge pressure 402 of the pump maintains a steady rate around the desired discharge pressure 408. Over the second segment 414, however, as the discharge pressure 402 begins to droop, multiple pumping elements of the pump actuate to cause a sharp pressure rise 420. Thereafter, the frequency of sequential element actuations increases and the discharge pressure 402 of the pump is maintained around the desired discharge pressure 408 over the third segment 416. The period 418, as noted in the graph, in this graph is considerably shorter than the corresponding period shown in FIG. 4, and spans for less than the time of the second segment 414, such that the pressure has reached the desired value before the third segment 416 begins.

In one embodiment, the sharp pressure rise 420 can be carried out during normal operation and replaces at least one normal pump element actuation such that the resolution of the pressure signal provided by the discharge pressure 402 is increased to permit a pressure sensor monitoring this parameter to more concisely detect a pressure rise rate, which is indicative of plunger velocity and stroke time. The stroke time is represented by the time required to complete each of the pressure rises 404. The stroke time can allow closed-loop feedback to the controller for adjusting target hydraulic pressure, which can improve the control the pump piston velocity within a desired range. In the embodiment shown in FIG. 5, for example, the distributor function 516 can be programmed to periodically command a multiple actuation event, even in the absence of the indication signal 520, such that the pressure sensor mentoring the discharge pressure can deduce or calculate the stroke time more accurately.

Figure 7:
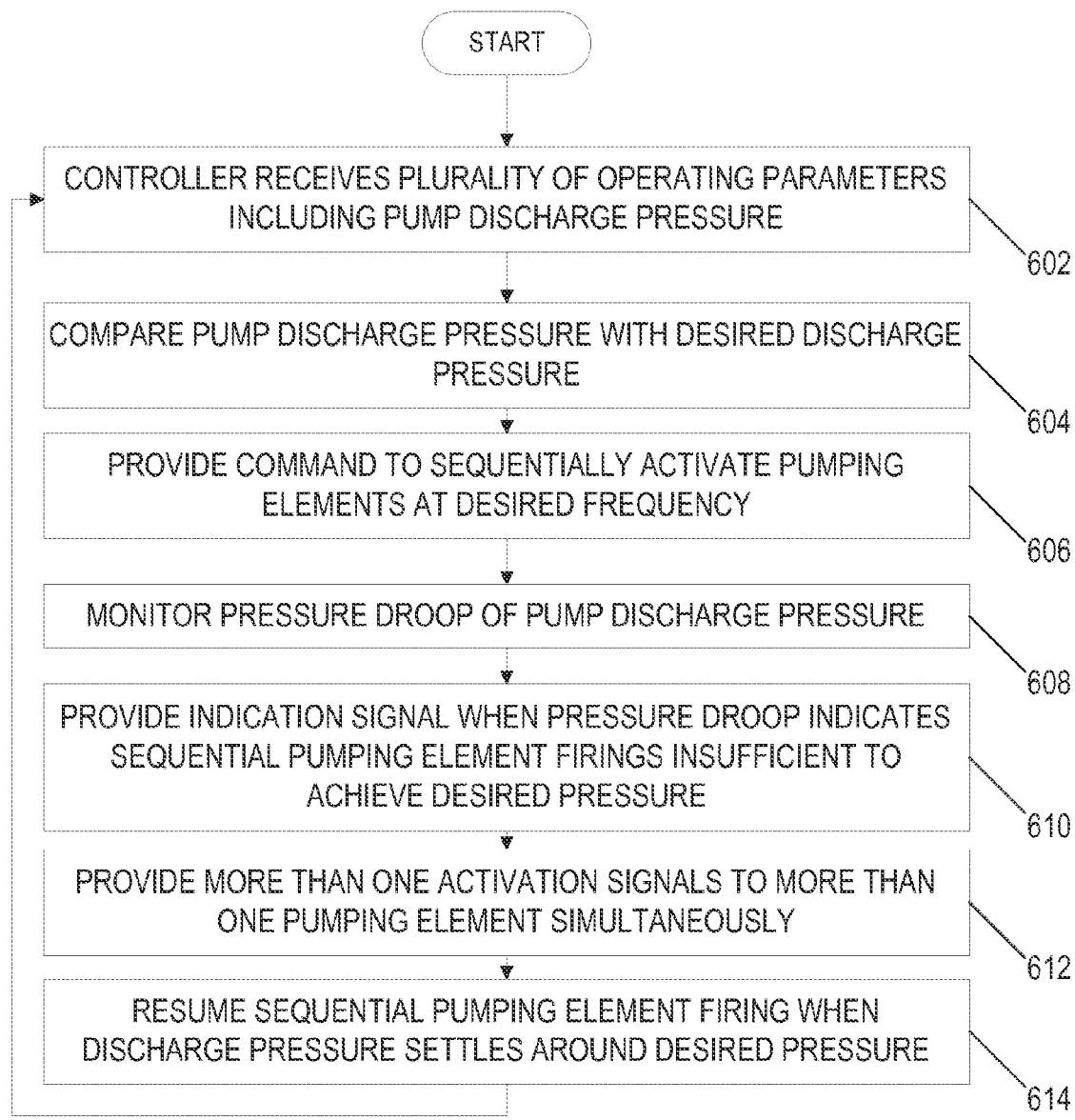
FIG. 7 is a flowchart for a method of operating a multi-element pump in accordance with the disclosure.

A flowchart for a method of operating a multi-element pump in accordance with the disclosure is shown in FIG. 7. In accordance with the method, in which a plurality of pumping elements, each of which is responsive to a respective actuation signal from a controller, the controller receives a plurality of engine operating parameters including a pressure signal directly or indirectly indicative of pump discharge pressure at 602. The controller, based on the pump discharge pressure, may compare the discharge pressure with a desired discharge pressure at 604, and provide a command to sequentially actuate pumping elements with a desired frequency at 606. The desired frequency may further depend on other parameters monitored such as engine speed. The controller may further use the comparison to determine whether the pump is capable of providing the desired pressure within a desired time. In one embodiment, the controller may monitor a pressure droop at 608 to provide an indication signal at 610 that is indicative of the need to actuate more than one pumping element at one time, i.e., when the pressure droop indicates that sequential pumping element actuations will be insufficient to achieve the desired discharge pressure of the pump. When the indication signal is present, the controller may provide more than one respective actuation signals simultaneously at 612, which will cause the pumping elements to actuate in a non-sequential fashion, at least temporarily. The controller may resume sequential pumping element actuation at 614 once the discharge pressure of the pump has settled around a desired discharge pressure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A fluid system, comprising:
a pump having a plurality of pumping elements, each of the plurality of pumping elements being independently responsive to a corresponding actuation signal to perform a pumping stroke that delivers a pumped amount of fluid at a pump discharge;
a pressure sensor disposed to monitor a fluid pressure at the pump discharge and provide a pressure signal;
an electronic controller associated with the pump and the pressure sensor, the electronic controller disposed to receive the pressure signal and provide the corresponding actuation signal to each of the plurality of pumping elements, the electronic controller being further programmed to maintain a desired pressure at the pump discharge, the electronic controller being programmed to:
monitor the fluid pressure provided by the pressure sensor;
compare the fluid pressure with the desired pressure to determine a pressure error;
provide commands to sequentially actuate the plurality of pumping elements when the pressure error is within a threshold range; and
provide commands to actuate more than one of the plurality of pumping elements simultaneously, such that more than one pumped amounts of fluid are delivered simultaneously at the pump discharge, when the pressure error droops outside of the threshold range.

2. The fluid system of claim 1, wherein a program of the electronic controller for providing commands to sequentially actuate the plurality of pumping elements includes a command signal providing a frequency of sequential actuation of the plurality of pumping elements.

3. The fluid system of claim 2, wherein the command signal is further based on a parameter indicative of a rate of consumption of a fluid at the pump discharge by a consumer.

4. The fluid system of claim 3, wherein the consumer is an engine and wherein the fluid is fuel drawn from a fuel tank by the pump.

5. The fluid system of claim 4, wherein the fuel is liquefied natural gas (LNG).

6. The fluid system of claim 1, wherein the electronic controller is further programmed to correct the commands to sequentially actuate the plurality of pumping elements and the commands to actuate more than one of the plurality of pumping elements based on an indication of a temperature of a fluid at the pump discharge.

7. The fluid system of claim 1, wherein the electronic controller is further programmed to periodically command two or more of the plurality of pumping elements to actuate simultaneously, even when the pressure error is within the threshold range, such that a resolution of a pressure rise at the pump discharge is increased, and wherein the electronic controller is further programmed to calculate a stroke time when the pressure rise at a pump discharge pressure is increased.

8. A method for operating a pump, comprising:
providing a plurality of pumping elements, each being independently actuated in response to an actuation signal from a controller;
receiving and monitoring at the controller a plurality of engine operating parameters including a pressure signal that is directly or indirectly indicative of a pump discharge pressure at a pump discharge;
comparing the pump discharge pressure with a desired discharge pressure;
providing a command to sequentially actuate pumping elements at a desired frequency;
determining whether the pump is capable of providing a desired pressure within a desired time; and
providing a command to non-sequentially actuate more than one pumping element simultaneously when an indication is present that sequential pumping element actuations will be insufficient to achieve the desired discharge pressure of the pump.

9. The method of claim 8, wherein determining whether the pump is capable of providing the desired pressure is accomplished by monitoring a pressure droop in the pressure signal, comparing the pressure droop with a threshold range, and providing an indication signal of a need to actuate more than one of the plurality of pumping elements at one time when the pressure droop falls outside of the threshold range.

10. The method of claim 8, further comprising resuming sequential pumping element actuation when the pump discharge pressure re-enters within a predetermined range around the desired discharge pressure.

11. The method of claim 8, wherein providing a command to sequentially actuate the pumping elements includes sequentially actuating the pumping elements at the desired frequency.

12. The method of claim 11, wherein the desired frequency is based on a parameter indicative of a rate of consumption of a fluid at the pump discharge by a consumer.

13. The method of claim 12, wherein the consumer is an engine and wherein the fluid is fuel drawn from a fuel tank by the pump.

14. The method of claim 13, wherein the fuel is liquefied natural gas (LNG).

15. The method of claim 8, further comprising correcting the commands to sequentially actuate the pumping elements and the commands based on a temperature of a fluid at the pump discharge.

16. The method of claim 8, further comprising periodically commanding two or more of the pumping elements to actuate simultaneously to increase a pressure rise at the pump discharge, and calculating a stroke time when the pressure rise at the pump discharge pressure is increased.

17. A fuel system for an engine, comprising:
a cryogenic fluid storage tank containing a fuel;
a pump having a plurality of pumping elements, each of the plurality of pumping elements being independently responsive to a corresponding actuation signal to perform a pumping stroke that delivers a pumped amount of fuel at a pump discharge;
a pressure sensor disposed to monitor a fluid pressure at the pump discharge and provide a pressure signal;
an electronic controller associated with the pump and the pressure sensor, the electronic controller disposed to receive the pressure signal and provide the corresponding actuation signal to each of the plurality of pumping elements, the electronic controller being further programmed to maintain a desired pressure at the pump discharge, the electronic controller being programmed to:
monitor the fluid pressure provided by the pressure sensor;
compare the fluid pressure with the desired pressure to determine a pressure error;
provide commands to sequentially actuate the plurality of pumping elements when the pressure error is within a threshold range; and
provide commands to actuate more than one of the plurality of pumping elements simultaneously, such that more than one pumped amounts of fluid are delivered simultaneously at the pump discharge, when the pressure error droops outside of the threshold range.

18. The fuel system of claim 17, further comprising the engine, wherein the engine consumes the fuel provided by the pump thus tending to decrease a discharge pressure of the pump.

19. The fuel system of claim 17, wherein the electronic controller is further programmed to correct the commands to sequentially actuate the plurality of pumping elements and the commands to actuate more than one of the plurality of pumping elements based on an indication of a temperature of the fuel at the pump discharge.

20. The fuel system of claim 17, wherein the electronic controller is further programmed to periodically command two or more of the plurality of pumping elements to actuate simultaneously, even when the pressure error is within the threshold range, such that a resolution of a pressure rise at the pump discharge is increased, and wherein the electronic controller is further programmed to calculate a stroke time when the pressure rise at a pump discharge pressure is increased.

* * * * *